United States Patent
Itoh

(10) Patent No.: US 7,164,497 B2
(45) Date of Patent: Jan. 16, 2007

(54) COLOR IMAGE PROCESSING APPARATUS

(75) Inventor: Hiroshi Itoh, Hachioji (JP)

(73) Assignee: Olympus Optical Co., Ltd., Tokyo (JP)

(*) Notice: Subject to any disclaimer, the term of this patent is extended or adjusted under 35 U.S.C. 154(b) by 911 days.

(21) Appl. No.: 09/881,784

(22) Filed: Jun. 18, 2001

(65) Prior Publication Data

US 2001/0052938 A1  Dec. 20, 2001

(30) Foreign Application Priority Data

Jun. 20, 2000  (JP)  ............... 2000-184375

(51) Int. Cl.
*H04N 1/40*  (2006.01)

(52) U.S. Cl. ...................... 358/1.9; 358/500

(58) Field of Classification Search .......... 358/1.9, 358/2.1, 500–506
See application file for complete search history.

(56) References Cited

U.S. PATENT DOCUMENTS

| | | | |
|---|---|---|---|
| 5,796,430 A * | 8/1998 | Katoh et al. | 348/246 |
| 5,854,655 A * | 12/1998 | Watanabe et al. | 348/247 |
| 6,683,643 B1 * | 1/2004 | Takayama et al. | 348/247 |
| 6,765,614 B1 * | 7/2004 | Matsukawa | 348/246 |
| 6,781,626 B1 * | 8/2004 | Wang | 348/273 |

FOREIGN PATENT DOCUMENTS

| | | |
|---|---|---|
| JP | 05-236358 | 9/1993 |
| JP | 06-205302 | 7/1994 |
| JP | 06-245148 | 9/1994 |
| JP | 06-284346 | 10/1994 |
| JP | 07-162757 | 6/1995 |
| JP | 10-126795 | 5/1998 |
| JP | 10-322603 | 12/1998 |

* cited by examiner

*Primary Examiner*—Thomas D. Lee
*Assistant Examiner*—Stephen Brinich
(74) *Attorney, Agent, or Firm*—Westerman, Hattori, Daniels & Adrian, LLP.

(57) ABSTRACT

A color image processing apparatus for detecting and correcting fault pixels in a color image pickup device having a plurality of pixels each with a correspondingly disposed filter device of color filter having a plurality of filter devices respectively of predetermined colors, including means for detecting fault pixels by establishing a correlation among pixel signals along an arrangement of consecutive ones of identical color, and means for correcting pixel signals corresponding to the fault pixels detected at the fault pixel detecting means. By thus establishing a correlation among pixel signals along an arrangement of consecutive ones of identical color to detect and correct fault pixels, the fault pixels are efficiently detected in a small range and correction of the fault pixels is performed in real time.

10 Claims, 11 Drawing Sheets

FIG. 1
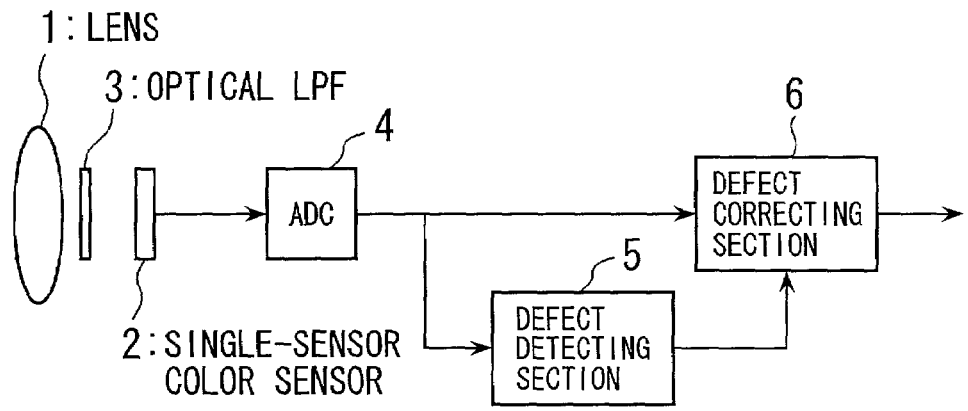
FIG. 2
| R | G | R | G | R | G | R | G |
|---|---|---|---|---|---|---|---|
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |
FIG. 3
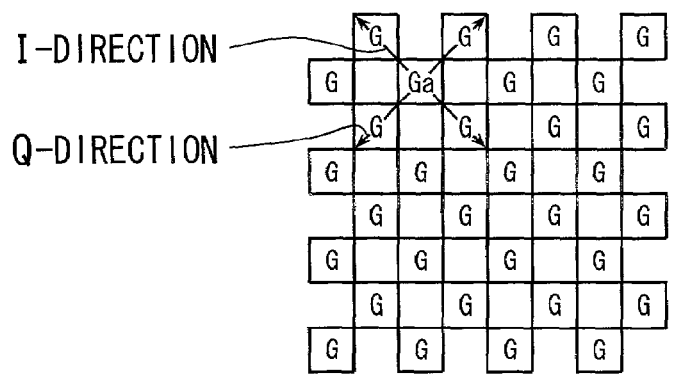

FIG. 7
![Bayer pattern grid with Rx highlighted]
| FIG. 8A | FIG. 8B | FIG. 8C | FIG. 8D |
|---------|---------|---------|---------|
| Pt. 1   | Pt. 2   | Pt. 3   | Pt. 4   |
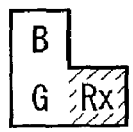 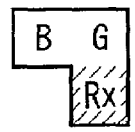 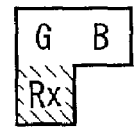 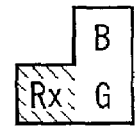
| FIG. 8E | FIG. 8F | FIG. 8G | FIG. 8H |
|---------|---------|---------|---------|
| Pt. 5   | Pt. 6   | Pt. 7   | Pt. 8   |
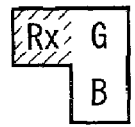 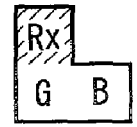 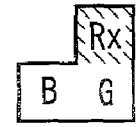 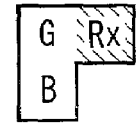

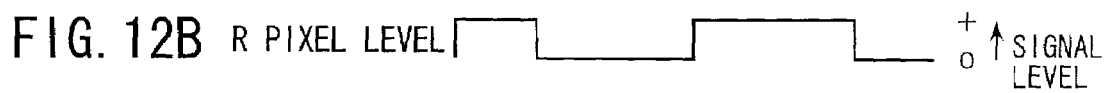
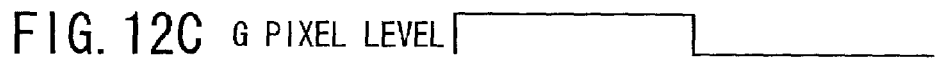
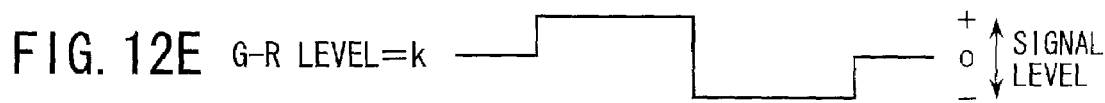
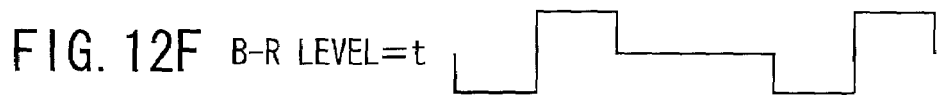
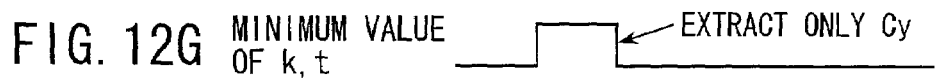
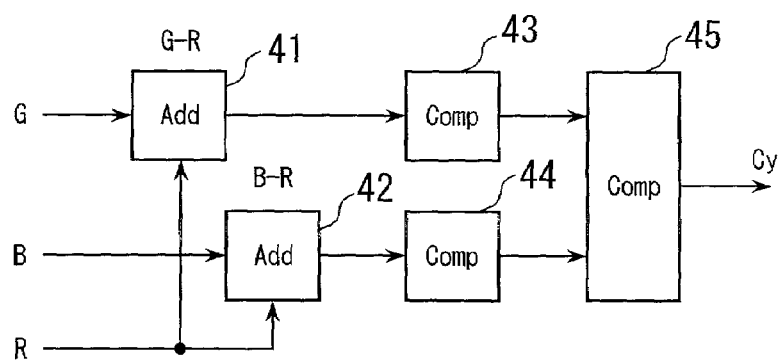
FIG. 13

FIG. 14A
| R | G | R | G | R |
|---|---|---|---|---|
| G | Ba | Gb | Bb | G |
| R | Ga | Ra | Gc | R |
| G | Bc | Gd | Bd | G |
| R | G | R | G | R |
FIG. 14B    FIG. 14C    FIG. 14D    FIG. 14E
Pt. 1       Pt. 2       Pt. 3       Pt. 4
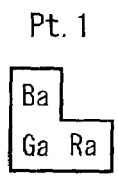 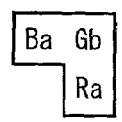 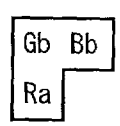 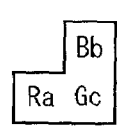
FIG. 14F    FIG. 14G    FIG. 14H    FIG. 14I
Pt. 5       Pt. 6       Pt. 7       Pt. 8
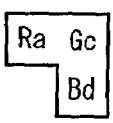 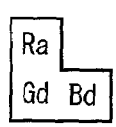 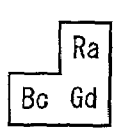 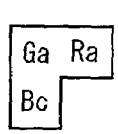

FIG. 17
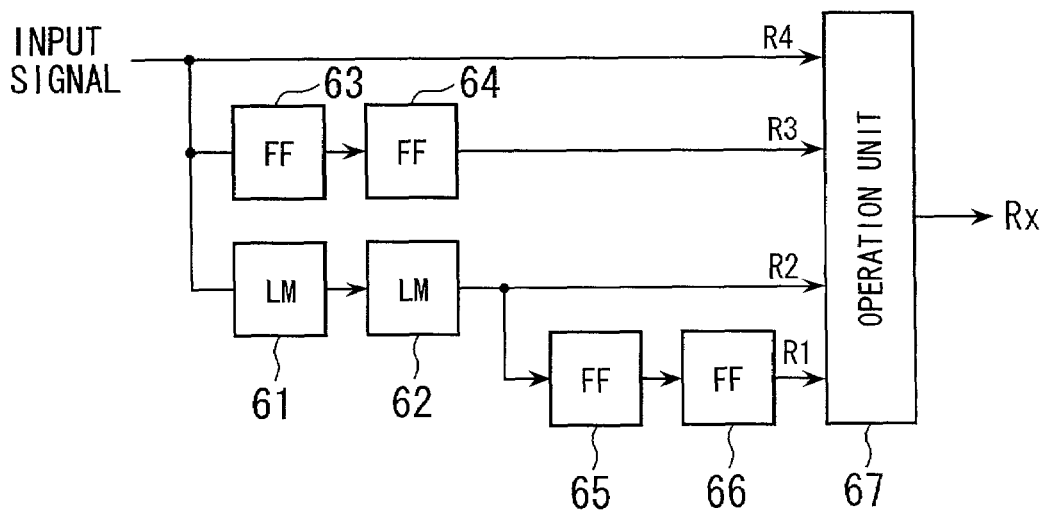
FIG. 18A
| B | G | B | G | B | G | B |
| G | R | G | R | G | R | G |
| B | G | B | G | B | G | B |
| G | R | G | Rx | G | R | G |
| B | G | B | G | B | G | B |
| G | R | G | R | G | R | G |
| B | G | B | G | B | G | B |
FIG. 18B
Pt. 1'
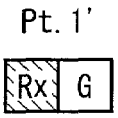
FIG. 18C
Pt. 2'
FIG. 18D
Pt. 3'
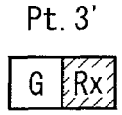
FIG. 18E
Pt. 4'

FIG. 19
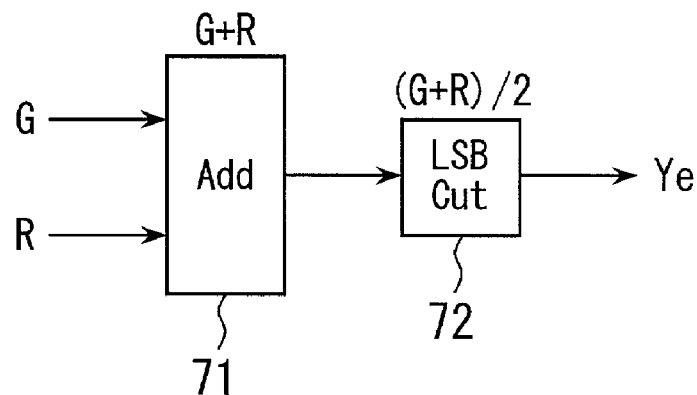
FIG. 20A
FIG. 20B
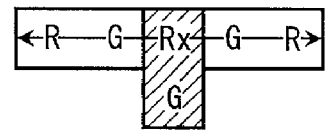
FIG. 20C
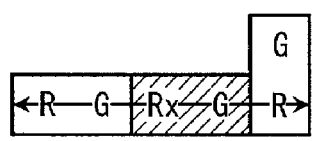
FIG. 20D
FIG. 20E
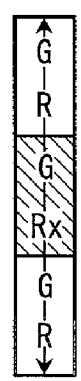
FIG. 20F
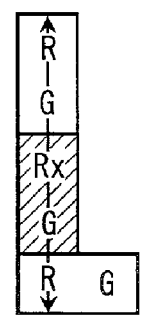

COLOR IMAGE PROCESSING APPARATUS

This application claims benefit of Japanese Application No. 2000-184375 filed in Japan on Jun. 20, 2000, the contents of which are incorporated this reference.

BACKGROUND OF THE INVENTION

The present invention relates to color image processing apparatus, and more particularly relates to a color image processing apparatus for performing detection and correction of pixel defects suitably for a single-sensor color sensor image or a like color image which is composed of a pixel array of different colors.

The rate of occurrence of defect pixels, i.e., fault pixels is generally higher and technology for detecting and correcting these is indispensable in such image input apparatus as a high-definition camera where a solid-state image pickup device having a large number of pixels is used. By correcting pixels at singularities represented by these fault pixels, a higher yield can be achieved of the solid-state image pickup device to greatly reduce price of the apparatus.

The known technologies for electrically correcting such fault pixels include the following techniques. Specifically, in a technique disclosed for example in Japanese patent laid-open applications Hei-5-236358, Hei-7-162757, Hei-10-322603, a memory is provided for previously storing and retaining locations of fault pixels which occur uniquely to each device at the time of fabrication of the solid-state image pickup devices. The memory is mounted on an image input device such as camera so as to extrapolate the fault pixels at predetermined locations by means of average values, etc., obtained from adjoining pixels while continuously surveying output signals from the memory.

Further, Japanese patent laid-open applications Hei-6-205302, Hei-6-245148, disclose a technique in which defects are detected and corrected in real time during readout of signals from the pixels without providing a memory. In particular, a pixel to be observed and nearby four consecutive pixels are used so that, when the observed pixel stands out in the surrounding pixel signals by more than a certain value while at the same time the preceding and succeeding adjoining pixel signals are at certain level or above, the observed pixel is determined as defective and is corrected.

Furthermore, Japanese patent laid-open application Hei-6-284346 discloses a solid-state image pickup apparatus using a color filter of mosaic array of complementary colors in which stored to a memory for a plurality of fields are the results of comparison between detection output signal of level difference of pixel signals of identical color and a threshold value. Fault pixels are determined based on such information retained in the memory, thereby making it possible to accurately detect the fault pixels even in the presence of edge components and to perform correction among pixels of identical color by using surrounding pixels of different colors.

Moreover, in a defect correcting apparatus for color image pickup device as disclosed in Japanese patent laid-open application Hei-10-126795, signal of fault pixel regarding its luminance signal is corrected by adjoining pixels irrespective of the color of the pixels, while it is corrected by signals of nearby pixels of identical color regarding its color signals. The defect due to difference in hue is thereby made less conspicuous at the same time of the defect in luminance.

The one disclosed in the above mentioned Japanese patent laid-open applications Hei-5-236358, Hei-7-162757, Hei-10-322603 requires an exclusive memory for every individual sensor, i.e., each camera. It cannot be diverted to another camera. It is also incapable of dealing with those defects which occur due to a change with the passage of time after the shipping of camera from factory. In addition, there is a problem that capacity of the memory for storing the locations of defect is increased in proportion to the increase in number of pixels resulting from higher definition of image, increasing both price and power consumption.

On the other hand, the one disclosed in Japanese patent laid-open applications Hei-6-205302, Hei-6-245148, while not requiring a memory for storing the locations of defect, is capable of dealing with a black-and-white sensor, since detection of fault pixels using consecutive pixels is premised. If, however, the technique disclosed in these publications is applied to a color sensor or to an image without a consecutive occurrence of identical color, there is a problem that detection errors are caused due to the difference in sensitivity to specific color among the adjoining pixels of different colors. When, in order to avoid this, an attempt is made to detect fault pixels by using pixels of identical color, space of unit block for detection becomes very large in a color sensor without successions of identical color and a weaker correlation results among the pixels which are not spatially consecutive. For this reason, there is also a problem that detection errors tend to occur.

Further, while capable of accurately detecting fault pixels even in the presence of edge components, the one disclosed in Japanese patent laid-open application Hei-6-284346 requires for such purpose a memory for storing the results of comparison of level difference and threshold value for a plurality of fields, making it impossible to detect defects in real time. Also, while it is designed to correct defects of an identical color by operation of surrounding pixels of different colors, it is limited to those sensors having thereon a mosaic filter of complementary colors. Furthermore, the one disclosed in Japanese patent laid-open application Hei-10-126795 is with a problem that correlation among adjoining pixels cannot be obtained and erroneous detection of defects tends to occur, since defects regarding color signals are detected after all by using correlation among unconsecutive pixels of identical color which are separated from each other by more than one pixel.

SUMMARY OF THE INVENTION

To solve the above problems of the detection of pixel defects and correction techniques thereof in the conventional image sensor, it is a main object of the present invention to provide a color image processing apparatus capable of complying with a color sensor and at the same time without having a memory of detecting and correcting pixel defects in real time by successively extracting information. The color image processing apparatus is capable of efficiently detecting fault pixels by pixel signals in a small range and of performing the real-time correction processing without requiring an area memory or the like.

In accordance with a first aspect of the invention, there is provided a color image processing apparatus for detecting and correcting fault pixels in a color image pickup device having a plurality of pixels each with a correspondingly disposed filter device of color filter having a plurality of filter devices respectively of predetermined colors, including: means for detecting fault pixels by establishing a correlation among pixel signals along an arrangement of consecutive ones of identical color; and means for correcting pixel signals corresponding to the fault pixels detected at the fault pixel detecting means.

Since a correlation is established among pixel signals along an arrangement of consecutive ones of identical color to detect and correct fault pixels, it is possible to efficiently detect the fault pixels in a small range. In addition, the fault pixels can be corrected in real time without requiring an area memory or the like. The above main object is thereby achieved.

It is another object of the invention to provide a color image processing apparatus in which fault pixels can be efficiently detected very easily by pixel signals in a small range.

In accordance with a second aspect of the invention, the fault pixel detecting means of the color image processing apparatus of the first aspect detects fault pixels by correlating pixel signals along an arrangement of spatially consecutive filter devices of identical color.

A color filter thus used has the filter devices of identical color consecutively arranged for example in an oblique direction such as in the manner of G (green) pixels on Bayer-type arrayed color filter. It is thereby possible to detect fault pixels very easily by pixel signals in a small range by using such consecutive arrangement. The above object is thereby achieved.

It is yet another object of the invention to provide a color image processing apparatus in which fault pixels can be efficiently detected by pixel signals in a relatively small range even in the case where spatially consecutive pixels of identical color do not directly exist.

In accordance with a third aspect of the invention, the fault pixel detecting means of the color image processing apparatus of the first aspect operates pixel signals of a plurality of pixels corresponding to a plurality of adjoining filter devices of colors which are not identical to produce operation-generated color over a plurality of pixels and establishes a correlation among pixel signals along an arrangement of spatially consecutive ones of identical operation-generated color to detect fault pixels.

By such construction, when spatially consecutive pixels of identical color do not directly exist, consecutive ones of identical color are produced by operation of adjoining pixels of colors which are not identical and defects can be detected by correlating pixel signal levels along the direction of such succession. It is thus possible to efficiently detect fault pixels by pixel signals in a relatively small range even in the absence of spatially consecutive pixels of identical color. The above object is thereby achieved.

It is a further object of the invention to provide a color image processing apparatus in which defects can be efficiently detected by pixel signals in small ranges in the order of fewer detection error.

In accordance with a fourth aspect of the invention, the fault pixel detecting means of the color image processing apparatus of the first aspect detects first fault pixels by correlating pixel signals along an arrangement of spatially consecutive filter devices of identical color and in addition then operates pixel signals of a plurality of pixels corresponding to a plurality of adjoining filter devices of colors which are not identical to produce operation-generated color so as to detect second fault pixels by correlating pixel signals along an arrangement of spatially consecutive ones of identical operation-generated color.

In detecting fault pixels, detection errors are generally reduced as the amount of information is increased, i.e., in the case of a color image, as the increase in the number of corresponding pixels of identical color. In the fourth aspect of the invention constructed as the above, therefore, fault pixels can be efficiently detected in the order of fewer detection errors, since the previously performed technique for detecting the first fault pixels uses the technique which is readily applicable to the case of having a large number of pixels of directly identical color. The above object is thereby achieved.

It is a further object of the invention to make it possible to efficiently execute the detection of the second fault pixels in the color image processing apparatus of the fourth aspect.

In accordance with a fifth aspect of the invention, the fault pixel detecting means of the color image processing apparatus of the fourth aspect excludes the first fault pixels from the information to be subjected to detection at the time of detecting the second fault pixels.

In the defect detecting technique used in detecting the second fault pixels in the color image processing apparatus of the fourth aspect, the number of pixels applied to the detection processing is small and the defect detecting accuracy thereof is reduced. By, as in the above fifth aspect, omitting the previously obtained first fault pixels from the subject information to be used at the time of detecting the second fault pixels, however, selection of conditions for example at the time of detection can be made easily and it becomes possible to perform an efficient detection of defects. The above object is thereby achieved.

It is a further object of the invention to provide a color image processing apparatus in which a plurality of pixel groups of identical color are produced by operation of a plurality of pixels of different colors so that fault pixels can be readily detected.

In accordance with a sixth aspect of the invention, there is provided a color image processing apparatus for detecting and correcting fault pixels in a color image pickup device having a plurality of pixels each with a correspondingly disposed filter device of color filter having a plurality of filter devices respectively of predetermined colors. It includes: means for, among an observed pixel and a plurality of pixels adjoining to the observed pixel and covered by filter devices of colors not identical thereto, forming a plurality of pixel group patterns having different arrangement of plurality of pixels including the observed pixel; means for operating to obtain identical color for the pixel group patterns based on signals obtained from the respective pixels of each pixel group pattern formed at the pixel group pattern forming means; and fault pixel detecting means for detecting pixel group pattern including fault pixel by establishing among the pixel group patterns a correlation of the signals of each pixel group pattern obtained by the means for operating to obtain identical color.

By thus forming a plurality of pixel group patterns having different arrangement of plurality of pixels including the observed pixel and by correlating the signals of the pixel group patterns obtained by the operation for obtaining identical color, pixel group patterns having fault pixel can be readily detected. The above object is thereby achieved.

It is a further object of the invention to provide a color image processing apparatus in which defects can be detected without requiring a line memory exclusively used for the defect detection means.

In accordance with a seventh aspect of the invention, the color image processing apparatus according to the first or sixth aspect includes a color generation processing circuit having a line memory for obtaining predetermined color image signals based on image signals from the color image pickup device, the fault pixel detecting means using the line memory for the color generation processing circuit also as the line memory for fault pixel detecting circuit.

By thus using the line memory for the color generation processing circuit also as the line memory for the fault pixel detecting circuit, defects can be detected without requiring an exclusive memory for the fault pixel detecting means and it becomes possible to reduce the hardware size and power consumption. The above object is thereby achieved.

BRIEF DESCRIPTION OF THE DRAWINGS

FIG. 1 schematically shows the construction of a color camera using a single-sensor color sensor to which the color image processing apparatus of the present invention is applied.

FIG. 2 shows a color filter of Bayer-type array.

FIG. 3 shows the manner of detecting fault pixels by using a correlation of G pixels in a color sensor of Bayer-type array.

FIG. 7 shows a pixel array where Rx is the pixel to be observed in a color sensor of Bayer-type array.

FIGS. 8A to 8H illustrate eight patterns of different arrangement of Cg unit consisting of a group of adjoining R,G,B pixels including the observed pixel Rx as the R pixel in the pixel array shown in FIG. 7.

FIGS. 12A to 12G are timing charts showing the manner of extracting a complementary color Cy from the three primary color signals of R,G,B.

FIG. 13 is a block diagram showing an operation circuit for extracting Cy signal from three primary color signals of R,G,B.

FIGS. 14A to 14I show a Bayer-type array color sensor and Cg unit patterns each consisting of a pixel group of three different pixels including the observed pixel Ra.

FIG. 17 is a block diagram showing a color generating operation circuit for generating by means of interpolation R image from a color image of Bayer-type array.

FIGS. 18A to 18E show a Bayer-type array color sensor and Cg unit patterns each consisting of a two-pixel group including the observed pixel Rx.

FIG. 19 is a block diagram showing an operation circuit for extracting signal of complementary color Cy from two primary color signals of R, G.

FIGS. 20A to 20F show examples of taking three adjoining Cg units where Cg unit patterns shown in FIGS. 18B to 18E are placed in a regular succession.

DESCRIPTION OF THE PREFERRED EMBODIMENT

Figure 4:
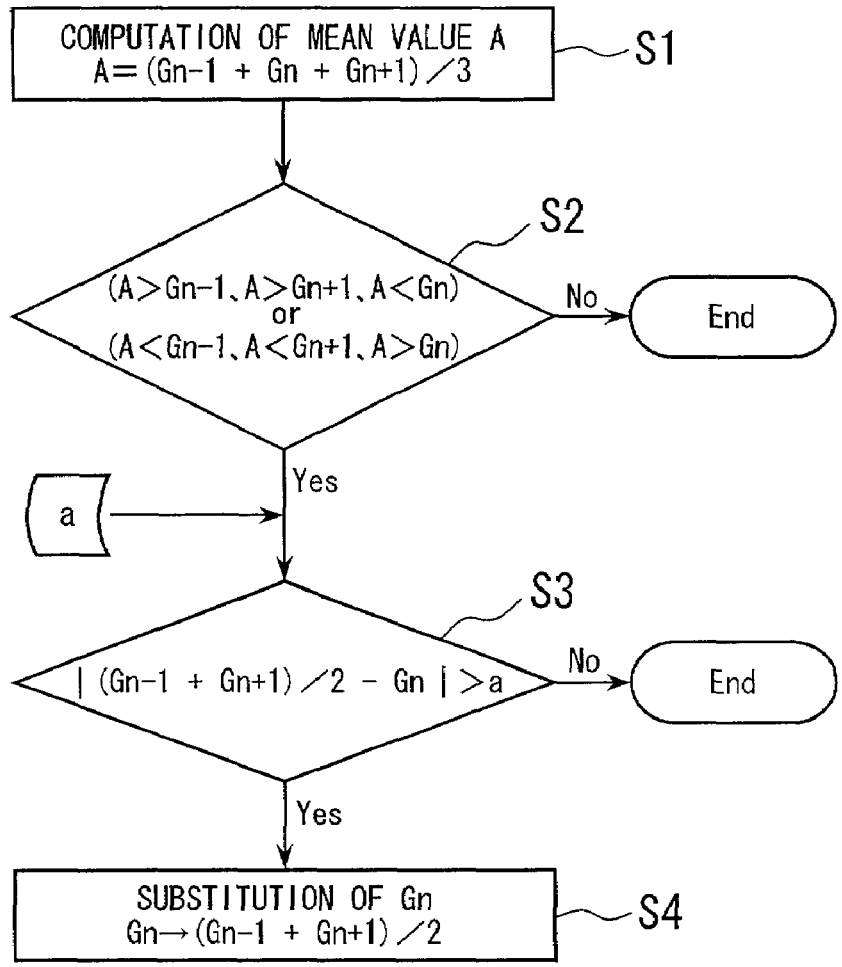
FIG. 4 is a flowchart for explaining detection of defects and correction procedure thereof from a correlation among three pixels of identical color.

Some embodiments of the invention will now be described. FIG. 1 schematically shows the construction of a single-sensor color camera using a single-sensor color sensor to which color image processing apparatus of the invention is applied. Included in FIG. 1 are: 1, a lens through which an object light is caused to enter; 2, a single-sensor color sensor having a color filter for example of Bayer-type array for converting the object light into electrical signals; 3, an optical low-pass filter disposed at a preceding stage of the single-sensor color sensor, for eliminating optical interference among pixels of the single-sensor color sensor 2; 4, an analog-to-digital converter for converting image signals outputted from the single-sensor color sensor 2 into digital signals; 5, a defect detecting section for detecting fault pixels from digital image signals; and 6, a defect correcting section for correcting fault pixels detected at the fault detecting section 5.

In thus constructed single-sensor color camera, the electrical signals of object image obtained at the single-sensor color sensor 2 are converted into digital signals at the analog-to-digital conversion circuit 4, subjected to detection of defects at the defect detecting section 5, corrected of defects at the defect correcting section 6, and then sent to other image processing sections, etc., at subsequent stage.

A description will now be given with respect to some specific embodiments of the defect detecting section 5 and defect correcting section 6 in a single-sensor color camera constructed as the above. A first embodiment thereof will be described below. The first embodiment corresponds to the first and second aspects of the present invention. Since, as shown in FIG. 2, G filter devices are disposed consecutively without interruption along oblique directions in the single-sensor color sensor having color filter of Bayer-type array, fault pixels can be detected by using a correlation among corresponding adjoining pixels of identical color (G pixels) along an oblique direction.

In this case, as shown in FIG. 3, detection of defect is performed simultaneously in the two oblique directions (I direction and Q direction) regarding an observed pixel Ga to be subjected to the defect detection. Ga pixel is finally determined as a fault pixel only when it is determined as a defect at the defect detection in both of the two directions.

By thus detecting defects along the two oblique directions, detection errors can be avoided in the case where image object is a slanting line having a correlation along an oblique direction. In particular, if the image object is a slanting line having a width of about one pixel, the observed pixel is determined as a fault pixel by the detection of defect where a correlation is assumed along a direction vertical to such slanting line. Since, however, there is a correlation along the slanting line, it is determined as a normal pixel and detection error is avoided by the defect detection in the oblique direction along the slanting line.

A description will now be given by way of algorithm shown in the flowchart of FIG. 4 with respect to a specific technique for detecting and correcting defects from a correlation of consecutively arranged three pixels of identical color. Supposing Gn, a tested pixel to be observed, and pixels Gn−1 and Gn+1 obliquely adjoining thereto from both sides as shown in FIG. 5 as the G three pixels consecutively arranged in oblique direction, a mean value A of the outputs of the three pixels is first obtained by the following formula (1) (step S1).

$$A=(Gn-1+Gn+Gn+1)/3 \quad (1)$$

The output of each pixel is then compared with the mean value A so as to determine whether the necessary conditions shown in formula (2) are satisfied or not (step S2).

$$[A>Gn-1, A>Gn+1, A<Gn] \text{ or}$$

$$[A<Gn-1, A<Gn+1, A>Gn] \quad (2)$$

If the above necessary conditions shown in formula (2) are satisfied, then, it is furthermore determined whether the necessary conditions of formula (3) are satisfied or not (step S3).

$$|(Gn-1+Gn+1)/2-Gn|>a \quad (3)$$

where "a" is a positive variable parameter.

If the necessary conditions indicated in formula (3) are satisfied, the observed pixel Gn is determined as a fault pixel. The value of Gn, which has been determined as a fault pixel, is then interpolated by replacing it by (Gn−1+Gn+1)/2=B (step S4).

Figure 5:
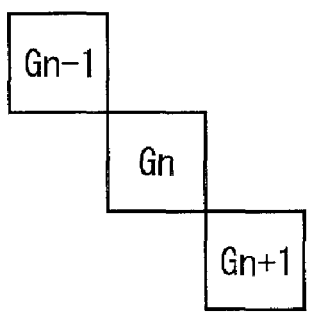
FIG. 5 shows the manner of arrangement of three pixels in detecting defects from a correlation among three pixels of identical color.
Figure 6:
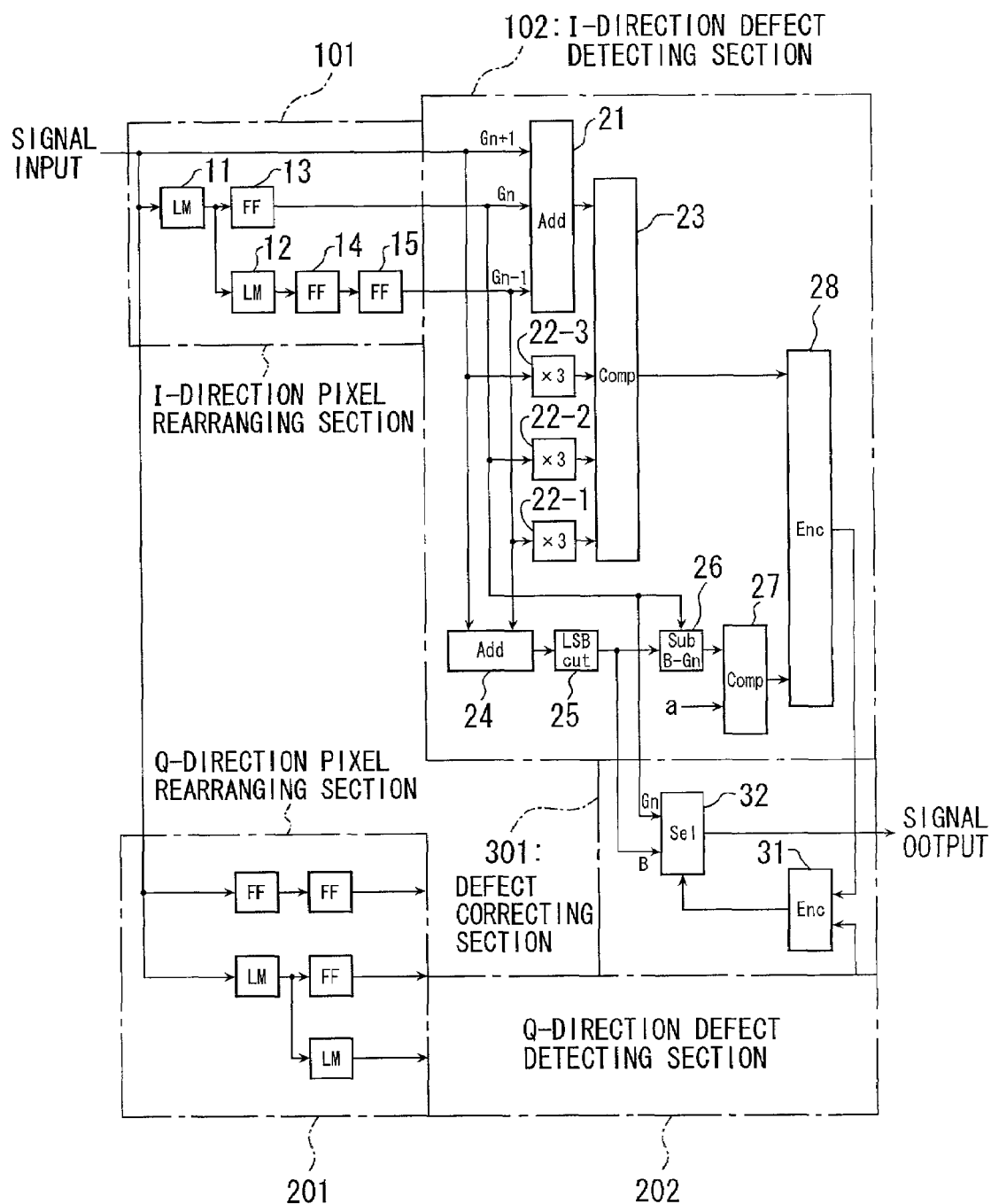
FIG. 6 is a block diagram showing an example of construction of the defect detecting and correcting section for executing the defect detection and correction techniques shown in the flowchart of FIG. 4.
Figure 9A:
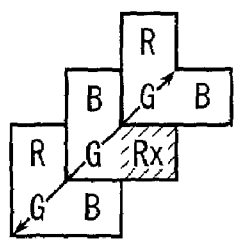
FIGS. 9A to 9J show examples of taking three adjoining Cg units where Cg unit patterns of identical shape are regularly consecutive.
Figure 9B:
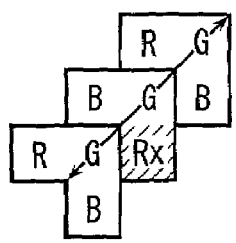
Figure 9C:
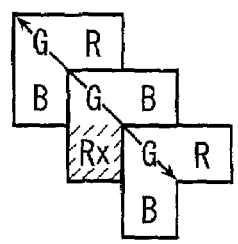
Figure 9D:
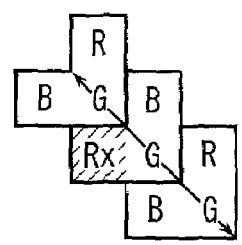
Figure 9E:
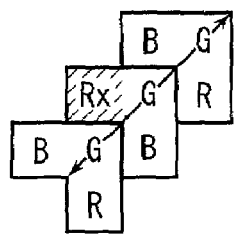
Figure 9F:
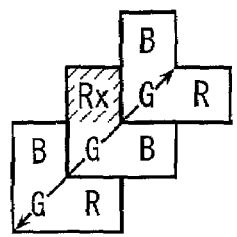
Figure 9G:
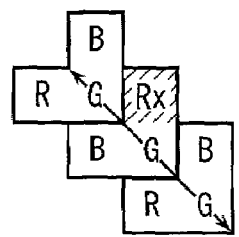
Figure 9H:
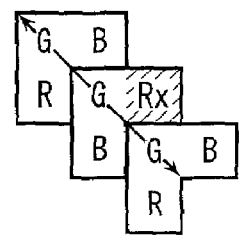
Figure 9I:
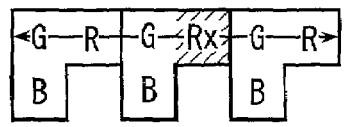
Figure 9J:
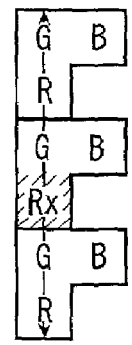

A description will now be given by way of FIG. 6 with respect to an example of hardware construction of the defect detecting and correcting section for executing the technique for detecting and correcting defects as shown in the flowchart of FIG. 4. Referring to FIG. 6, what is denoted by numeral 101 is a pixel rearranging section for registering the lines of three lines and adjusting the timings of pixel signals of the obliquely arranged pixels along I direction. It includes: two line memories 11, 12 for delaying by one line; and flip-flops 13, 14, 15 for delaying by one pixel. What is denoted by numeral 102 is an I-direction defect detecting section. It includes: a first adder 21 for obtaining a mean value by adding together the three pixel signals of Gn−1, Gn, Gn+1 (one obtained by means of addition is caused to correspond to mean value A based on the above described formula (1), since the size of hardware construction is larger when the mean value is computed by means of division); multipliers 22-1, 22-2, 22-3 for respectively tripling the three pixel signals; a first comparison circuit 23 for comparing the output of the first adder 21 with each output of the multipliers 22-1, 22-2, 22-3; a second adder 24 for adding together the pixel signals of pixels Gn−1, Gn+1 which are adjoining to the observed pixel Gn at both sides thereof; an LSB cut circuit 25 for obtaining an average by reducing the output of the adder 24 to ½; a subtractor 26 for subtracting pixel signal of the observed pixel Gn from the output signal of LSB cut circuit 25 (mean value B of two pixels); a second comparison circuit 27 for comparing the output of the subtractor 26 with a threshold value "a"; and an encoder 28 for determining defect along I direction of the observed pixel Gn from the comparison results at the first and second comparison circuits 23, 27.

Referring also to FIG. 6, denoted by numeral 201 is a Q-direction pixel rearranging section constructed in a similar manner as the I-direction pixel rearranging section 101, and 202 is a Q-direction defect detecting section constructed in a similar manner as the I-direction defect detecting section 102. What is denoted by numeral 301 is a defect correcting section, including: an encoder 31 to which defect determining signals from the encoders of the I-direction defect detecting section 102 and Q-direction defect detecting section 202 are inputted to finally determine whether the observed pixel Gn is a fault pixel or not; and a selector 32 for selecting the pixel signal of observed pixel Gn or the mean value B of the adjoining pixels based on the output of the encoder 31.

The operation will now be described of thus constructed defect detecting and correcting sections. First, the pixel signal of the obliquely adjoining pixel Gn−1 is delayed by two lines and two pixels at the I-direction pixel rearranging section 101 through two line memories 11, 12 and two flip-flops 14, 15 and is inputted to the first adder 21 of the I-direction defect detecting section 102. Further, the pixel signal of observed pixel Gn is delayed by one line and one pixel through one line memory 11 and one flip-flop 13 and is also inputted to the first adder 21. Furthermore, the pixel signal of the obliquely adjoining pixel Gn+1 is directly inputted to the first adder 21. These input pixel signals Gn−1, Gn, Gn+1 are then added together at the first adder 21 to compute a mean value (3A) which corresponds to A in formula (1).

On the other hand, the pixel signals Gn−1, Gn, Gn+1 to be inputted to the first adder 21 are also inputted, respectively, to the multipliers 22-1, 22-2, 22-3 to compute 3Gn−1, 3Gn, 3Gn+1. The pixel signals of 3Gn−1, 3Gn, 3Gn+1 tripled by the multiplies and the output 3A of first adder 21 are then inputted to the first comparison circuit 23 for comparison so as to determine whether the conditions indicated by formula (2), i.e., conditions of (A>Gn−1, A>Gn+1, A<Gn) or (A<Gn−1, A<Gn+1, A>Gn) are satisfied or not.

Further, of the three pixels inputted to the first adder 21, the adjoining pixel signals Gn−1, Gn+1 are inputted to the second adder 24 to be added together. The output of such addition is inputted to LSB cut circuit 25 where it is reduced to ½ by cutting least significant 1 bit (LSB), thereby obtaining a mean value of the adjoining pixel signals [B=(Gn−1+Gn+1)/2]. At subtractor 26, then, subtraction is performed of the mean value B of the adjoining two pixel signals and the pixel signal of observed pixel Gn. The result of such subtraction and digital variable threshold value "a" to be set from an external source are compared with each other at the second comparison circuit 27 to determine whether the condition indicated by formula (3), i.e., |(Gn−1+Gn+1)/2−Gn|>a is satisfied or not. If both of the conditions are satisfied in making determination as to the conditions at the first comparison circuit 23 and second comparison circuit 27, the observed pixel Gn is determined at the encoder 28 as defective along I direction.

It is possible to make determination as to whether the conditions are satisfied or not at the first and second comparison circuits 23, 27 for example by means of coding at an encoder by putting all the inequality outputs into a logical value table such that digital value "H" is outputted every time when each inequality indicating a condition is satisfied while "L" is caused to be outputted in other cases.

Furthermore, the pixel signals of oblique three pixels in Q direction including the observed pixel Gn are similarly subjected to detection of defects at the Q-direction pixel rearranging section 201 and Q-direction defect detecting section 202. The detection output of I-direction defect detecting section 102 and the detection output of Q-direction defect detecting section 202 are then inputted to the encoder 31 of the defect correcting section 301. At encoder 31, only when the observed pixel Gn is determined as defective in the directions of both I-direction and Q-direction, the observed pixel Gn is finally determined as a fault pixel and, based on the output of the encoder 31, mean value B of the adjoining pixels are caused to be outputted by the selector 32 as a correcting signal instead of the pixel signal Gn of the observed pixel. Otherwise, the observed pixel Gn is determined as a normal pixel and the pixel signal Gn of observed pixel is outputted without change.

The above described defect detecting and correcting technique can be executed not only in images from image input apparatus in the form of camera but also in all image sources constructed by pixel patterns of different colors.

A description will now be given with respect to a second embodiment of defect detecting and correcting technique by the defect detecting section and defect correcting section. The second embodiment corresponds to the first and third aspects of the invention. In the technique shown in the above first embodiment, when pixels of identical color are arranged in succession, the consecutively arranged pixels of identical color are correlated to detect and correct defects. The present embodiment, however, is related to defect detecting and correcting technique in the absence of consecutive pixels of identical color.

In a color image pickup device of Bayer-type array, R pixels or B pixels are placed at every other pixel both horizontally and vertically. However, G and B pixels are necessarily adjoining to such nonconsecutive R pixel and G and R pixels adjoining to B pixel. In the present embodiment, thus, operation processing is performed by treating a 3-pixel group of R, G, B as one unit (hereinafter referred to as Cg unit) so that Cy (Cyan), Ma (Magenta), Ye (Yellow), which are the complementary colors of R, G, B, are pseudogenerated for each Cg unit. These spatially consecutively arranged complementary colors are correlated to detect and correct defects.

In particular, supposing as shown in FIG. 7 that Rx be the pixel to be observed in a color image pickup device of Bayer-type array, patterns Pt1 to Pt8 shown in FIGS. 8A to 8H for example are patterns of Cg units each consisting of a 3-pixel group of adjoining R, G, B including the observed pixel Rx as R pixel. Defects are detected by establishing a correlation among three adjoining Cg units in a direction along which Cg patterns of identical shape are regularly consecutive. It should be noted that, while FIGS. 9A to 9J show examples of the manner of taking three adjoining Cg units where Cg patterns of identical shape are regularly consecutive, there are various other manners not shown in these examples.

Figure 10A:
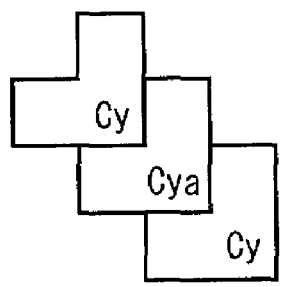
FIGS. 10A to 10C show the manner of disposing in adjoining connection the complementary color pixels which are generated in Cg units by operation.
Figure 10B:
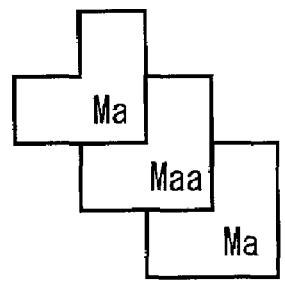
Figure 10C:
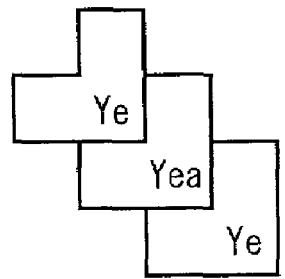

All of the corresponding three complementary colors Cy, Ma, Ye can be computed from Cg unit consisting of one 3-pixel group. In the case of using Cg pattern Pt4 as Cg unit, for example, the three types of complementary color pixel pattern are computed as shown in FIGS. 10A, 10B, 10C. The adjoining complementary color pixels can be correlated with the observed complementary color pixel Cya, Maa, Yea to detect defect of the observed complementary color pixel.

Generation of complementary color pixels will now be described. In general, a color image can be obtained by means of additive color mixing of images of mutually independent tristimulus values (three primary colors). In color cameras, predetermined R, G, B are used as the three primary colors. On the other hand, there are colors at the opposite poles of R, G, B three primary colors. Cy, Ma, Ye correspond as complementary colors to the three primary colors of R, G, B.

Figure 11:
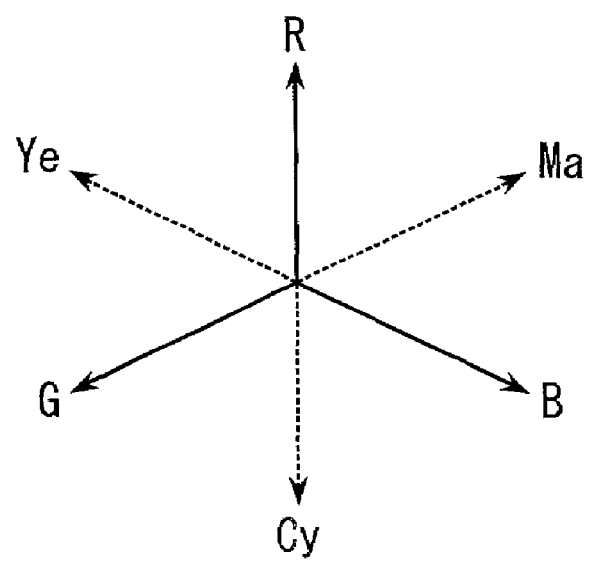
FIG. 11 shows relationship in color space of the complementary colors with the three primary colors of R,G,B.

The relationship between the primary colors and the complementary colors may be represented as shown in FIG. 11 by a simple color space. In particular, the complementary colors have a plus and minus relationship to the primary colors. In an attempt to render the entire color space by using R, G, B as three primary colors, R pixel for example should in theory be sensitive to Ye object and Ma object without having sensitivity to objects in Cy which is the complementary color of R.

In other words, since, Ye, the complementary color of B is produced by R and G components only and on the other hand has a plus and minus relationship with B, it can be approximated with those without B components. Similarly, Cy, the complementary color of R is produced by G and B components only and Ma, the complementary color of G is produced by R and B components only. The three complementary colors can thus be extracted in a simple manner from the mutual relationship of the three primary colors.

In the case of a color bar consisting of R, G, B, Cy, Ma, Ye as shown in FIG. 12A taken as the object, for example, the colors can be extracted from the relative magnitude of operation values of the difference between the primary colors (R-G, G-B, B-R, etc.), since the colors to which the pixels of R, G, B are sensitive are determined as indicated by R, G, B pixel levels in FIGS. 12B, 12C, 12D. In the case of extracting the complementary color Cy, for example, it suffices to operate the minimum value of (B-R) and (G-R). In particular, signal level k of (G-R) and signal level t of (B-R) are computed as shown in FIGS. 12E, 12F. It is possible to extract Cy only as shown in FIG. 12G by operating the minimum value of the difference signal levels k, t. It should be noted that, in obtaining the minimum value of the difference signal levels k, t, negative components are replaced by "0", since the negative components in the difference signal levels k, t, do not exist as signal level.

A description will now be given by way of FIG. 13 with respect to the construction of operation circuit for extracting signal of complementary color Cy from the three primary color signals of R, G, B. The Cy operation circuit includes: an adder 41 for use in computing (G-R); an adder 42 for use in computing (B-R); a first comparator 43 for zero-clipping negative values of the output signal of adder 41; a second comparator 44 for zero-clipping negative values of the output signal of adder 42; and a third comparator 45 for comparing the output signals of first comparator 43 and second comparator 44 to selectively output the least value thereof.

R, G, B signals are then inputted to the Cy operation circuit of such construction so that R signal is subtracted from G signal at the (G-R) computing adder 41 and R signal is subtracted from B signal at the (B-R) computing adder 42. Negative values of these subtraction results are then respectively zero-clipped at the first comparator 43 and second comparator 44. Thereafter, the least values of the zero-clipped (G-R) signal and (B-R) signal is selected at the third comparator 45 to extract Cy signal.

In this manner, Cy, Ma, Ye, which are the complementary colors of the three primary colors of R, G, B, are generated from adjoining three pixels of R, G, B. Defects of complementary color pixel can be detected by establishing a correlation among those of identical operation-generated complementary color which are spatially consecutively arranged. The defect detecting technique in this case is not different from the defect detecting technique in the presence of consecutively arranged pixels of identical color as shown in the first embodiment. Specifically, in the case of detecting defects by an arrangement of adjoining Cg unit patterns in the direction shown in FIGS. 10A, 10B, 10C, defects in Cg unit can be detected by the same processing procedure by using defect detecting means of an entirely identical construction as the detecting of defect in I direction in the detection of G defect in the first embodiment.

In thus detecting defects by using complementary colors generated by means of complementary color producing operation by Cg unit, if defects are similarly detected not only of one complementary color such as Cy alone but also of other complementary colors, i.e., Ma, Ye, defects can also be detected regarding an object of one complementary color. In particular, if the object is in a single color for example of Ye, it is impossible to detect defects by establishing a correlation based on Ma or Cy while the defect detection becomes possible by establishing a correlation based on Ye. By detecting defects based on all the complementary colors as described above, therefore, defect detection can be performed even in the case of an object in a single complementary color.

Furthermore, regarding the direction of arrangement of Cg units, it is also possible to detect defects by using correlation in directions other than the direction shown in FIGS. 10A, 10B, 10C such as those shown in FIGS. 9A to 9J. If circuit size of the defect detecting means is ignored, defects are detected more accurately as the increase in the number of correlation patterns based on the direction of arrangement for determining defects.

Here, the presence of defect in each Cg unit of complementary color pixels is found out by defect detection which is based on correlation of adjoining arrangements of 3-pixel Cg units of identical complementary color pixels. When an occurrence of defect is determined, however, it is impossible to immediately determine which pixel of the three pixels of R, G, B of such Cg unit is defective.

A description will now be given thus with respect to the technique for determining a fault pixel within Cg unit.

To detect fault pixel within Cg unit, similar defect detection is performed for each of Cg unit patterns of different pixel group including a specific observed pixel.

For example, in order to determine pixel defect in a color image pickup device of Bayer-type array as shown in FIG. 14A, Cg unit patterns of 3-pixel group including Ra pixel (observed pixel) are considered. There are eight types of patterns, Pt1 to Pt8 as shown in FIGS. 14B to 14I, of Cg unit consisting of 3-pixel group including Ra pixel. If all Cg unit patterns Pt1 to Pt8 are determined as defective regarding these eight types of Cg unit patterns, Ra pixel, which is the pixel to be observed, is determined as defective. On the other hand, if it is determined that there is no defect in Cg unit pattern Pt1, the observed pixel Ra is already found not defective.

In this case, however, it is not necessary to perform detecting operation for all of the eight Cg unit patterns Pt1 to Pt8. In particular, since determination of defect is sequentially performed in the case where defects are detected by executing readout of pixels of the color image pickup device, there are some pixels in the Cg unit pattern for which the presence or absence of defect has already been found out. By excluding during defect detecting processing these pixels for which the presence or absence of defect has been found, it is possible to reduce the number of Cg unit patterns to be used in determining fault pixels.

In particular, when fault pixels are detected by sequentially performing readout operation from the upper left in the color image pickup device of Bayer-type array shown in FIG. 14A, determination as to defect has already been completed of Ba, Gb, Bb, Ga pixels at the point of determining defect of Ra pixel. Accordingly, in the case where it has already been found out that none of these pixels is a fault pixel, Ra pixel can be decided to be defective if Cg unit pattern Pt1 shown in FIG. 14B is determined as defective.

In the color image pickup device of Bayer-type array, G pixels are the largest in number and detection of defect of G pixels is possible based on consecutively arranged G pixels without operation for producing complementary color by Cg unit. Accordingly, in detecting defects by complementary color of Cg units in the second embodiment obtained by performing complementary color producing operation, the number of Cg unit patterns necessary for actual defect detection can be reduced by determining defect of R, B pixels based on the result of such defect detection of G pixels. The defect detecting circuit can thus be constructed as having smaller size.

Here, in cases where the already known results of determination as to defect are to be used, such determination results are usually stored to an area memory so that they are referred to by address. In the present invention, however, it is not required to have an exclusive area memory for retaining the result of determination as to defects of G pixels. Defect flags of G pixel are delayed correspondingly to operation processing time necessary for determining defects of R, B pixels by using flip-flops, line memories, etc., thereby making processing in time series possible.

Figure 15:
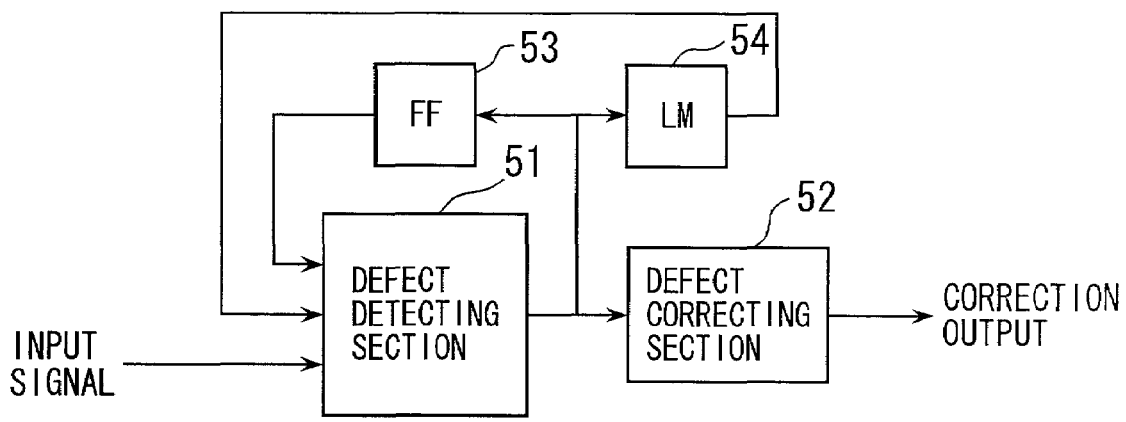
FIG. 15 is a block diagram showing an example of construction of the defect detecting and correcting circuit for, without having an exclusive area memory, detecting/correcting defects by referring to the determination results of pixels already determined of defects in the preceding line and the same line.

A description will now be given by way of FIG. 15 with respect to circuit construction for detecting and correcting defects without having an exclusive memory as described, by referring to the result of determination of those pixels already determined of defects in the preceding and in the same line. A fault pixel detecting and correcting circuit shown in FIG. 15 includes a flip-flop 53 and a line memory 54. The result of defect detection of preceding pixels such as G pixels detected by defect detecting section 51 are supplied again to the defect detecting section 51 by using flip-flop 53 and line memory 54 at timings when defect detection data regarding such G pixels are wanted at predetermined Cg unit for producing complementary color. It should be noted that numeral 52 denotes a defect correcting section.

By such construction, without retaining in an exclusive memory previously obtained defect determination data such as of G pixels, real-time feedback is possible of the defect determination data of such G pixels which can be referred to in determining defects.

Specifically, the result of determination at defect detecting section 51 is set for example as "H" for defects and "L" for normal ones. It is recorded to line memory 54 in the order of arrangement of pixels in the color image pickup device or is delayed correspondingly to predetermined clocks by flip-flop 53 and is inputted again to the defect detecting section 51. Timings at this time for example in determining defect of Cg unit pattern Pt1 shown in FIG. 14B are such that inputs are provided at timings when the defect determination results of Ba, Ga can be referred to. In other words, the referred defect determination results are fed back at timing when Ra pixel signal to be processed of defect detection is coming in and at the same time operation for detecting defect of such pixel is to be performed. Since defect determination processing is performed in real time in the same stream as the readout of pixels on the color image pickup device, it is not necessary to recognize address of fault pixels on the color image pickup device if timings are fixed as described above.

Further, in such process, if for example it is already known that Ga is defective when detecting defects by the patterns Pt1 to Pt8 of complementary color producing Cg units, the processing can be more promptly performed by excluding patterns Pt1, Pt8 which are the Cg unit patterns to which Ga pertains, and by executing defect detecting operation only by the other Cg unit patterns Pt2 to Pt7.

In the case as described in the foregoing second embodiment where defects are detected based on Cg units of which complementary color producing operation has been performed, the plurality of Cg patterns including a specific observed pixel are composed of pixels that are spatially very near in distance to each other. For this reason, a strong correlation can be presumed among the Cg patterns and it is thought that significant differences do not occur in their signal levels.

A defect detecting technique using such concept will now be described. In this defect detecting technique, a mean value is obtained of signal levels of a plurality of Cg unit patterns and those Cg unit patterns alienated in excess of a predetermined threshold from the mean value are determined as including fault pixel.

For example, mean value is obtained of the signal levels of eight Cg patterns shown in FIG. 14B to 14I. Those Cg unit patterns alienated in excess of a threshold value "b" from such mean value are determined as including fault pixel. If, for example, the following inequality (4) holds for Cg unit pattern Pt3, it is determined that Cg unit pattern Pt3 includes fault pixel.

$$|Pt3-\Sigma Ptn(n=1 \text{ to } 8)/8|>b \qquad (4)$$

It is thereby possible to omit defect detection processing by Cg units of a plurality of adjoining patterns Pt3.

In this defect detecting technique, detection of defects is possible by various patterns in addition to the Cg unit patterns shown in FIGS. 14B to 14I. An optimal defect detecting apparatus can be constructed corresponding to the system.

In order to form a final image from the output of a single-sensor color image pickup device, then, images composed of pixels of a plurality of colors on the same color image pickup device are interpolated from surrounding pixels of identical color to produce a plurality of color images. In the Bayer-type single-sensor color image pickup device, R, G, B images, which are the primary colors generally considered as reference, are produced as shown in FIG. 16.

Figure 16:
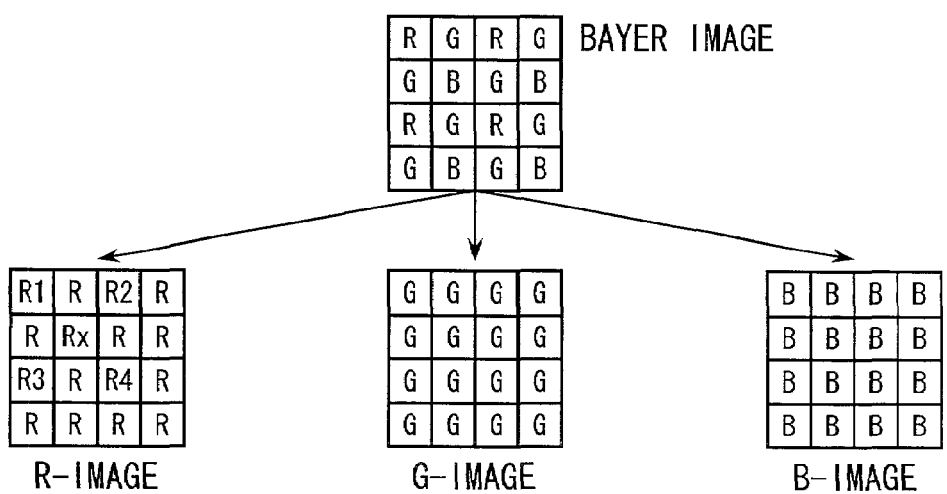
FIG. 16 schematically shows the manner of generating R, G, B images from a color image of Bayer-type array.

In the case of producing R image from Bayer image by pixel interpolation, operation for example of Rx=ΣRn(n=1 to 4)/4 is performed from R1, R2, R3, R4 in FIG. 16 which originally exist on the sensor one line before and after that in which Rx of R image exists.

As shown in FIG. 17, the operation circuit for generating color signals of such interpolated pixels includes two 1-line delaying line memories 61, 62, four 1-pixel delaying flip-flops 63, 64, 65, 66 and an operation unit 67. Two line memories are necessary.

In this manner, the single-sensor color image pickup apparatus uses a line memory for performing operation from vertical direction in the color interpolation and generation processing. The line memory for the color interpolation and generation processing can be used also as the line memory which is required at the defect detecting and correcting section of the invention. Defects can be detected by a correlation among pixels or pixel blocks which are consecutive for example in an oblique direction, without providing a separate line memory exclusively for the defect detecting and correcting section. Further, in defect detection and correction processing according to the present invention, hardware size and/or power consumption can be furthermore reduced by performing the defect detection and correction processing in parallel with the interpolation and color generation operation and in addition by, if possible, sharing operation results to be obtained.

In the above second embodiment, complementary colors are pseudo-generated by using 3-pixel group of R, G, B as Cg unit and defects are detected and corrected by establishing a correlation among those of complementary color that are spatially consecutively arranged. Supposing, however, Rx as the observed pixel in the color image pickup device of Bayer-type array shown in FIG. 18A, a simpler Cg unit can be constructed by two adjoining pixels which include the observed pixel Rx as R pixel.

Cg unit patterns Pt1' to Pt4' shown in FIGS. 18B to 18E are the Cg unit patterns consisting of such two pixels (two primary colors of R, G). The complementary color (Ye) generated by Cg unit consisting of such two pixels (two primary colors of R, G) is extracted by added average of the two primary colors (R, G) adjoining in the expedient color space shown in FIG. 11. Such extracting process is performed for example in an operation circuit which includes an adder 71 and LSB cut circuit 72 as shown in FIG. 19.

The manners shown in FIGS. 20A to 20F are examples of taking three adjoining Cg units where Cg unit patterns of identical shape are regularly consecutive, so as to detect defects by a correlation. There are however various other manners than these examples. A defect detecting technique can be performed similarly as in the above described embodiments.

By thus extracting complementary color by Cg units composed of two pixels, circuit size can be reduced and an improvement in operation speed is possible though accuracy in detecting defects is somewhat lowered. Furthermore, Cg unit by two pixels is with more choice of patterns than Cg unit by three pixels, making detection of defects possible at higher degrees of freedom.

As has been described by way of the above embodiments, it is possible according to the first aspect of the invention to provide a color image processing apparatus capable of efficiently detecting fault pixels by pixel signals in a small range and of correcting the defects in real time without requiring an area memory or the like. According to the second aspect of the invention, it is possible in the color image processing apparatus of the first aspect to detect fault pixels very easily and efficiently by pixel signals in a small range. According to the third aspect of the invention, it is possible in the color image processing apparatus of the first aspect to efficiently detects fault pixels by pixel signals in a relatively small range even in the case where spatially consecutive pixels of identical color do not directly exist. According to the fourth aspect of the invention, it is possible in the color image processing apparatus of the first aspect to efficiently detect fault pixels by pixel signals in small ranges in the order of fewer detection error. According to the fifth aspect of the invention, it is possible in the color image processing apparatus of the fourth aspect to efficiently execute the detection of second fault pixels which is to be performed after the detection processing of first fault pixels.

According to the sixth aspect of the invention, it is possible to provide a color image processing apparatus in which a plurality of pixel groups of identical color are produced by operation of a plurality of pixels of different colors so that fault pixels can be readily detected. According to the seventh aspect of the invention, it is possible in the color image processing apparatus of any one of the first to sixth aspects to detect defects without requiring a line memory exclusively used for the defect detection means so that hardware size and/or power consumption can be reduced.

What is claimed is:

1. A color image processing apparatus for detecting and correcting fault pixels in a color image pickup device having a plurality of pixels each with a correspondingly disposed filter device of color filter having a plurality of filter devices respectively of predetermined colors, said color image processing apparatus comprising:

means for detecting fault pixels by establishing a correlation among pixel signals along an arrangement of consecutively adjoining ones of identical color; and means for correcting pixel signals corresponding to the fault pixels detected at the fault pixel detecting means, wherein said fault pixel detecting means processes pixel signals of a plurality of pixels corresponding to a plurality of adjoining filter devices of colors which are not identical to produce operation-generated color over a plurality of pixels and establishes a correlation among pixel signals along an arrangement of spatially consecutive ones of identical operation-generated color to detect fault pixels.

2. A color image processing apparatus for detecting and correcting fault pixels in a color image pickup device having a plurality of pixels each with a correspondingly disposed filter device of color filter having a plurality of filter devices respectively of predetermined colors, said color image processing apparatus comprising:

means for detecting fault pixels by establishing a correlation among pixel signals along an arrangement of consecutively adjoining ones of identical color; and means for correcting pixel signals corresponding to the fault pixels detected at the fault pixel detecting means, wherein said fault pixel detecting means detects first fault pixels by correlating pixel signals along an arrangement of spatially consecutive filter devices of identical color and in addition then processes pixel signals of a plurality of pixels corresponding to a plurality of adjoining filter devices of colors which are not identical to produce operation-generated color so as to detect second fault pixels by correlating pixel signals along an arrangement of spatially consecutive ones of identical operation-generated color.

3. The color image processing apparatus according to claim 2, wherein said fault pixel detecting means excludes the first fault pixels from information to be subjected to detection at the time of detecting the second fault pixels.

4. A color image processing apparatus for detecting and correcting fault pixels in a color image pickup device having a plurality of pixels each with a correspondingly disposed filter device of color filter having a plurality of filter devices respectively of predetermined colors, said color image processing apparatus comprising:

means for detecting fault pixels by establishing a correlation among pixel signals along an arrangement of consecutively adjoining ones of identical color; and means for correcting pixel signals corresponding to the fault pixels detected at the fault pixel detecting means, further comprising a color generation processing circuit having a line memory for obtaining predetermined color image signals based on image signals from said color image pickup device, and said fault pixel detecting means using said line memory for the color generation processing circuit also as the line memory for a fault pixel detecting circuit.

5. A color image processing apparatus for detecting and correcting fault pixels in a color image pickup device having a plurality of pixels each with a correspondingly disposed filter device of color filter having a plurality of filter devices respectively of predetermined colors, said color image processing apparatus comprising:

means for, among an observed pixel and a plurality of pixels adjoining to the observed pixel and having correspondingly disposed filter devices of colors not identical thereto, forming a plurality of pixel group patterns having different arrangement of plurality of pixels including the observed pixel;

means for operating to obtain identical color for the pixel group patterns based on signals obtained from the respective pixels of each pixel group pattern formed at the pixel group pattern forming means; and fault pixel detecting means for detecting pixel group pattern including fault pixel by establishing among the pixel group patterns a correlation of the signals of each pixel group pattern obtained by the means for operating to obtain identical color.

6. The color image processing apparatus according to claims 5, further comprising a color generation processing circuit having a line memory for obtaining predetermined color image signals based on image signals from said color image pickup device, and said fault pixel detecting means using said line memory for the color generation processing circuit also as the line memory for fault pixel detecting circuit.

7. A color image processing apparatus for detecting and correcting fault pixels in a color image pickup device having a plurality of pixels each with a correspondingly disposed filter device of color filter having a plurality of filter devices respectively of predetermined colors, said color image processing apparatus comprising:

means for detecting fault pixels by establishing a correlation among pixel signals along an arrangement of consecutively adjoining ones of identical color; and means for correcting pixel signals corresponding to the fault pixels detected at the fault pixel detecting means, wherein said fault pixel detecting means establishes a correlation among pixel signals respectively with respect to a first direction and with respect to a second direction different from the first direction along an arrangement of consecutive ones of identical color and determines as fault pixels those pixels which have been detected as defect both in the first direction and in the second direction.

8. A color image processing apparatus comprising a fault pixel detecting section for detecting fault pixels in a color image pickup device having a plurality of pixels each with a correspondingly disposed filter device of color filter having a plurality of filter devices respectively of predetermined colors, said fault pixel detecting section comprising:

a first direction defect detector for detecting pixel defect along an arrangement in a first direction of consecutively adjoining ones of identical color;

a second direction defect detector for detecting pixel defect along an arrangement in a second direction different from said first direction of consecutively adjoining ones of identical color; and a fault pixel determining unit for determining as fault pixels those pixels which have been detected as defect both at the first direction defect detector and at the second direction defect detector.

9. A color image processing method for detecting and correcting fault pixels in a color image pickup device having a plurality of pixels each with a correspondingly disposed filter device of color filter having a plurality of filter devices respectively of predetermined colors, said method comprising the steps of:

detecting fault pixels by establishing a correlation among pixel signals along an arrangement of consecutively adjoining ones of identical color; and correcting pixel signals corresponding to the fault pixels detected at the detecting steps, wherein said detecting fault pixel step includes processing pixel signals of a plurality of pixels corresponding to a plurality of adjoining filter devices of colors which are not identical to produce operation-generated color over a plurality of pixels and establishing a correlation among pixel signals along an arrangement of spatially consecutive ones of identical operation-generated color to detect fault pixels.

10. A color image processing method for detecting fault pixels in a color image pickup device having a plurality of pixels each with a correspondingly disposed filter device of color filter having a plurality of filter devices respectively of predetermined colors, said method comprising the steps of:

detecting pixel defect in a first direction and pixel defect in a second direction different from the first direction of an arrangement of consecutively adjoining ones of identical color; and determining as fault pixels those pixels which have been detected as defect both in the first direction and in the second direction at the detecting step.

* * * * *